United States Patent Office 2,772,898
Patented Dec. 4, 1956

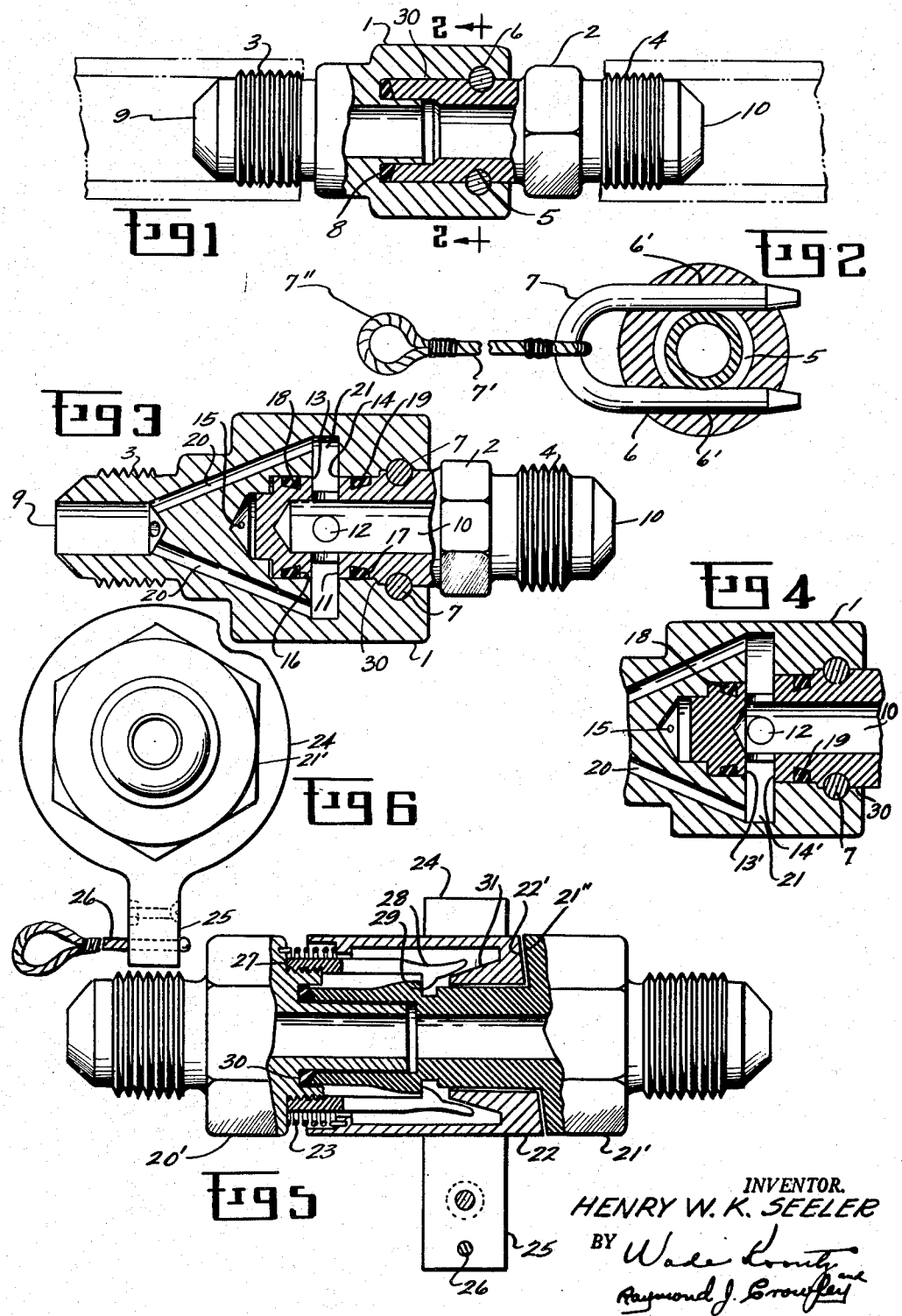

2,772,898

QUICK DISCONNECT COUPLING FOR HIGH PRESSURE GAS OR LIQUID

Henry W. K. Seeler, Dayton, Ohio, assignor to the United States of America as represented by the Secretary of the Air Force Application August 30, 1951, Serial No. 244,445

2 Claims. (Cl. 285—190)

(Granted under Title 35, U. S. Code (1952), sec. 266)

The invention described herein may be manufactured and used by or for the Government for governmental purposes without payment to me of any royalty thereon.

This invention relates to devices for quickly disconnecting high pressure lines and in particular to devices for enabling a pilot to sever himself from high altitude and high speed aircraft in order to safely eject himself from the ship.

One of the problems in ejecting pilots out of aircraft has been the difficulty in quickly disconnecting the supply lines to the pilot from the aircraft, for example, the oxygen supply line from the aircraft leading to the pilot wearing oxygen masks or pressurized suits. Since an efficient device for disconnecting the oxygen line becomes necessary when the occasion arises to abandon the ship, it is therefore an object of this invention to quickly disconnect the oxygen line from the pilot by a simple release mechanism.

Another object of this invention is to provide a coupling having a dual purpose, namely, for normally transmitting high pressure fluid and for quick separation into two parts.

A further object of this invention is to minimize the friction in the device resulting from the high pressure in the oxygen line when disconnecting the coupling.

A still further object of this invention is to use the high pressure in the oxygen line in separating the two part coupling.

These and other objects will become apparent from the following detailed description of the accompanying drawings which illustrate only some embodiments of this invention.

Figure 1 is a fragmentary cross-sectional view showing a disconnecting coupling for insertion into an oxygen line and for transmitting oxygen.

Figure 2 is a cross-sectional view on line 2—2 of Fig. 1 showing the quick disconnecting pin and pull cord.

Figure 3 is fragmentary cross-sectional view showing a coupling for overcoming friction on the disconnecting retaining pin by presenting equal pressure areas.

Figure 4 is a cross-sectional view similar to Figure 3 showing a preferred embodiment of the invention by presenting unequal pressure areas.

Figure 5 is a fragmentary cross-sectional view showing another modification of the subject invention.

Figure 6 is a side view of Figure 5.

In the above figures, similar parts have like numbers.

Referring to Figure 1, the two part quick release coupling device comprises an interfitting tubular female section or member 1 and male section or member 2. Female section 1 is connected to the oxygen line at 3 and the male section is connected to the oxygen line at 4. The male section 2 is positioned in the male section receiving bore 30 in the female section 1. The quick release means includes two openings 6 which extend through the female section 1 and are aligned with the half round annular groove 5 in the male section. The openings 6 present half round grooves to the half round annular grooves at the point 6', Fig. 2, thereby together making round openings through the coupling. A U-shaped retaining pin 7 acting as a quick release means extends through these openings thereby locking the sections 1 and 2. Attached to the retaining pin 7 is a pull cord 7' having a loop 7" on its other end secured to an ejection seat (not shown). An O ring is shown at 8 to seal the coupling, thereby preventing leakage of oxygen. The inlet bore in the female member 1 is shown at 9 and the outlet bore in the male member at 10. 500 p. s. i. is the normal pressure of the oxygen supplied to the pilot which pressure forces O ring 8 into tight engagement with the coupled members to further seal the device. When the ejection seat is thrown from the aircraft a simultaneous pull on cord 7' removes retaining pin 7 and automatically the sections 1 and 2 of the coupling separate due to the high pressure in the oxygen line.

An objection to the above modification is the force necessary to overcome the friction in the grooves 5 and 6 on retaining pin 7 due to the pressure in the oxygen lines thereby making it difficult to remove the retaining pin 7. Under test, a force of 28 pounds was required to overcome the friction due to a pressure of the fluid of 500 p. s. i. in the coupling. A method of overcoming this objection is shown in Figure 3 wherein the quick release means further includes diverting the fluid flow in the female section from the inlet bore 9 which is closed at one end into ports 20 which enter into the annular chamber 21. This chamber 21 is axially disposed beyond the closed end of bore 9 and is coaxial therewith. A male member receiving bore 30 also closed at one end is disposed at the opposite end of the female member 1 away from the inlet bore 9 and is coaxially aligned with the chamber 21 and the inlet bore 9. This male member receiving bore 30 communicates with chamber 21 and extends beyond it. When the male member 2 penetrates the male member receiving bore 30 in the female section 1 it cuts off the communication between the chamber 21 and the male member receiving bore 30. An axially extending bore 10 in the male member 2 is connected to groove 11 and ports 12, see Fig. 3. The annular groove or chamber 11 and ports 12 in the male section 2 are aligned with the annular groove or chamber 21 in the female section 1 to form an enlarged chamber and to provide a connection between the male member bore 10 and the chamber 21. This eliminates the force necessary to overcome the friction on the retaining pin 7 due to the pressure in the oxygen line by balancing out the high pressure. A small hole 15 extending through the female section to the ambient air serves as a check to any build-up of pressure behind the male section 2. Male section 2 is provided with annular wedge-shaped grooves 16 and 17 having O rings 18 and 19 therein.

In operation the oxygen flow is diverted through ports 20 and groove 21 into groove 11 and ports 12 then through outlet 10. In passing through groove 11 the pressure exerted on the faces of the groove 11 at 13 and 14 are equal since the areas at 13 and 14 are equal. Therefore, upon removal of retaining pin 7 there is no force due to the pressure tending to separate sections 1 and 2. This also eliminates the force on retaining pin 7 due to the high pressure in the oxygen line. The flow of fluid passes faces 13 and 14 of groove 11 into the wedge-shaped annular grooves 16 and 17 compressing the O rings 18 and 19 and sealing the coupling against leakage. In the event of leakage pass the O rings 18 and 19 due to deterioration and wear, pressure build-up behind the male section 2 will be prevented by exhausting this pressure through hole 15 to the atmosphere. Under test with the coupling in a vertical position and the retaining pin removed, 2000 p. s. i. was applied and the sections did not separate, the forces being balanced out. Also practically no force was required to eject the retaining pin under the 2000 p. s. i. with the coupling in a horizontal position and pin in place.

In the preferred embodiment of Fig. 4, there is disclosed an additional feature not present in the quick release means disclosed in the modification of Fig. 3. The additional feature shown in Fig. 4 includes means for producing a controlled unbalanced force acting between the male section and the female section when fluid under pressure flows through the coupling. This controlled unbalanced force is weak enough to eliminate removal difficulties caused by the frictional gripping of retaining pin 7 due to the decoupling force acting between the sections which is caused by the high fluid pressure flowing through them, but is strong enough to separate or kick out the sections when the retaining pin is removed. This is accomplished by making the faces of the groove 11 at 14', larger than the face at 13'. The increase in the effective pressure area at 14' creates the controlled unbalanced force tending to automatically separate or kick out the sections. Any desirable "kick out" force can be obtained by changing the relative area between faces 13' and 14'.

The embodiment of the invention shown in Figures 5 and 6 comprises coupling members 20' and 21' having uncoupling member 22 slidably and rotatably mounted on the member 20'. A torsion type spring 23 tends to hold the spiral cam surface 22' on member 22 against a similar cam surface 21'' of member 21'. A clamp member 24 around the member 22 includes an arm 25 carrying pull cord 26 to rotate the uncoupling member 22. A circular member 27 on the coupling member 20 includes several spring latch detents 28 which are adapted to engage a shoulder 29 on the member 21' to hold the coupling members together and compress the O ring 30. When the cord 26 is pulled the members 22 and 24 rotate and by reason of the spiral cam formations 21'' and 22' the uncoupling member 22 is forced downwardly. The annular cam face 31 engages the free ends of the latch detents 28 to force them away from the shoulder 29 and allow separation of the coupling members 20' and 21'. The torsion spring 23 acts also as a compression spring to hold the cam surfaces 21'' and 22' in engagement.

As a result of this invention the pilot can release himself from the aircraft by a minimum of effort.

Further, as a result of this invention a simple durable coupling which is capable of withstanding high pressures can be provided.

It is apparent the specific illustrations shown above have been given by way of illustration and not by way of limitation and that the inventions above described are subject to variation and modification without departing from the scope and intent of the invention, all of which variations and modifications are to be included within the scope and spirit of the present invention.

Whereby I claim:

1. A coupling for connecting conduits carrying a high pressure fluid comprising, a male member having a first and a second cylindrical member in axial alignment separated from each other by a first groove, said first cylindrical member having a diameter slightly smaller than said second cylindrical member, said male member having a first bore connecting with said first groove and adapted to be connected with a conduit, a female member having second and third bores slidably receiving said first and second cylindrical members on said male member, a second groove in said female member radially disposed about said first groove in said male member when in coupled relationship, a fourth bore within said female member adapted to be connected to a conduit, means forming a passage between said second groove and said fourth bore, whereby pressure within said first and second grooves tends to separate said male and female members by a force proportional to the difference in the diameters of said first and second cylindrical members on said male member, and quick release means for releasably securing said male and female members together.

2. The device as claimed in claim 1 wherein said quick release mechanism comprises a third groove on the exterior of one of said cylindrical members on said male member, said female member containing fifth bores tangential to said third groove, and a U-shaped pin slidable within said fifth bores and engaging said third groove.

References Cited in the file of this patent

UNITED STATES PATENTS

| 899,582 | Weston | Sept. 29, 1908 |
| 1,298,878 | Brown | Apr. 1, 1919 |
| 1,553,184 | Mueller | Sept. 8, 1925 |
| 1,985,012 | Boehm | Dec. 18, 1934 |
| 2,021,241 | Mall | Nov. 19, 1935 |
| 2,088,530 | McCune | July 27, 1937 |
| 2,092,116 | Hansen | Sept. 7, 1937 |
| 2,263,293 | Ewald | Nov. 18, 1941 |
| 2,346,051 | Seamark | Apr. 4, 1944 |
| 2,503,495 | Koester | Apr. 11, 1950 |
| 2,511,495 | Crot | June 13, 1950 |
| 2,511,765 | Bradbury | June 13, 1950 |
| 2,578,542 | Hanson | Dec. 11, 1951 |
| 2,619,367 | Hanson | Nov. 25, 1952 |

FOREIGN PATENTS

| 453,125 | France | Mar. 28, 1913 |